United States Patent [19]

Raffaeli

[11] Patent Number: 4,793,022
[45] Date of Patent: Dec. 27, 1988

[54] TREAD PROTECTOR FOR DUAL WHEEL CASTER

[75] Inventor: Lidio P. Raffaeli, Stratford, Conn.

[73] Assignee: Stewart-Warner Corporation, Chicago, Ill.

[21] Appl. No.: 136,496

[22] Filed: Dec. 22, 1987

Related U.S. Application Data

[63] Continuation of Ser. No. 836,117, Mar. 4, 1986, abandoned.

[51] Int. Cl.⁴ ............................................ A47B 91/06
[52] U.S. Cl. ........................................ 16/45; 220/270
[58] Field of Search ............... 16/18 CE, 45, 47; 301/37 R; 150/54 A, 54 B; 220/270

[56] References Cited

U.S. PATENT DOCUMENTS

| | | | |
|---|---|---|---|
| 2,121,843 | 6/1938 | Vaughn | 220/270 |
| 2,219,534 | 10/1940 | Ryerson | 150/54 A |
| 2,926,954 | 3/1960 | Lyon | 301/37 R |
| 3,286,875 | 11/1966 | Frankenberg | 220/270 |
| 3,997,938 | 12/1976 | Pinaire et al. | 16/45 |

Primary Examiner—Nicholas P. Godici
Assistant Examiner—Karen Skillman
Attorney, Agent, or Firm—Lorusso & Loud

[57] ABSTRACT

A one-piece plastic wheel protector for dual wheel casters that snaps over and locks on the wheels and is easily removed by a breakaway pull tab.

9 Claims, 2 Drawing Sheets

TREAD PROTECTOR FOR DUAL WHEEL CASTER

This is a continuation of co-pending application Ser. No. 06/836,117 filed on Mar. 4, 1986 now abandoned.

BACKGROUND OF THE INVENTION

Dual wheel casters have over the past several decades achieved considerable commercial success for movably supporting office equipment and furniture. With the advent of high-strength plastics and design improvements it is now possible to support relatively heavy office equipment, such as copy machines and computer terminals on stands supported by all-plastic dual wheel casters at a cost far less than the cost of comparable metal casters.

Dual wheel casters have increased load capacity over single wheel casters, which in part enables them to be made from less expensive materials and an additional advantage of this caster design is that they swivel more readily than single wheel casters because the wheels can rotate in opposite directions as the caster pivots.

Plastic components used in constructing these dual wheel casters, are subject to scuffing during shipment when attached to office equipment and furniture, particularly in the wheel tread area. Frequently shipping personnel during loading and unloading at the delivery site will roll the equipment on the casters over abrasive surfaces such as asphalt and concrete, causing permanent wheel and horn member scuffing prior to the final delivery of the goods to the purchasing office location. It is possible to remove the csaters from the equipment and install the casters at the final office site, but this makes it considerably more difficult to move the equipment and it is therefore more desirable to have the casters in place during the delivery process.

One attempt at solving the problem is to surround the tread with an inexpensive plastic sleeve that is removed at the final destination. One such sleeve of which Applicant is aware includes an integral radial tab with a central finger hole that is pulled to remove it from the wheel when the caster reaches its final destination. The sleeve has several very thin radial projections around its inner edge that attempt to hold the sleeve axially in position on the associated wheel, but these projections frequently fail to prevent the sleeve from coming off during shipment resulting in dirty and damaged caster wheels. The narrow axial locking projections are necessary in this design in order to permit the removal of the sleeve at the final destination. Such a wheel protecting sleeve is manufactured by Steelcase Corp. of Grand Rapids, Mich.

It is a primary object of the present invention to ameliorate the problems noted above in protective devices for dual wheel casters.

SUMMARY OF THE PRESENT INVENTION

In accordance with the present invention, a one-piece plastic wheel protector is provided for dual wheel casters that snaps over and securely locks on the wheels during shipment, and at the same time is easily removed at the final destination by a breakaway pull tab that severs the protector. This enables the protector to be provided with secure wheel locking projections because the locking projections are rendered ineffective when the protector is broken apart by the pull tab. Another advantage in the present design that the pull tab itself serves to protect the face or hub of the wheel from impact damage as well as foreign material.

Toward these ends, the present wheel protector is a one-piece plastic injection molding constructed of an impact-resistant material such as polypropylene and includes an annular tread protector portion that slides over the wheel tread and has four integral radial projections that snap over and lock the tread protector axially on the associated wheel. The outer side of this annular tread-protecting portion has an annular web protecting the outer edge of the tread and crossed web strips that are intersected by a diametral pull tab that extends across most of the protector and assists with the webs in protecting the face or hub of the wheel.

The protector is easily removed from the wheel by pulling on the tab which breaks the tab away from the crossed webs and severs the tread protecting portion.

DETAILED DESCRIPTION OF THE PREFERRED EMBODIMENT

Figure 1:
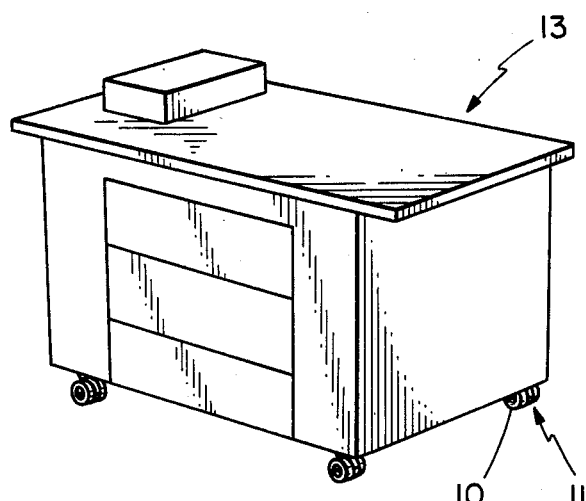
FIG. 1 is a perspective view of a piece of office equipment supported by dual wheel casters with wheel protectors according to the present invention.
Figure 2:
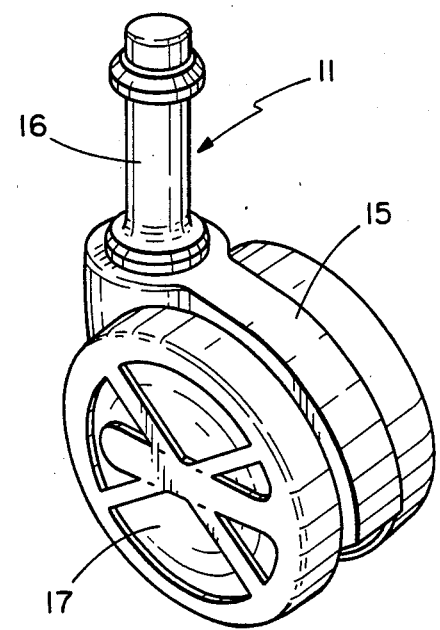
FIG. 2 is an enlarged perspective view of a dual wheel caster with the present wheel protectors.
Figure 3:
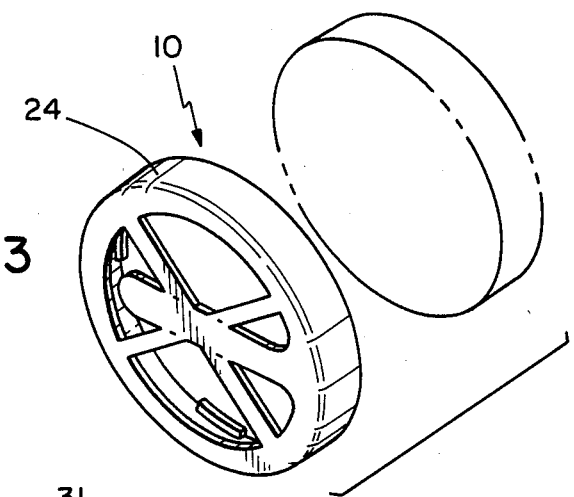
FIG. 3 is a perspective exploded view of one wheel protector according to the present invention and a diagramatic wheel.
Figure 4:
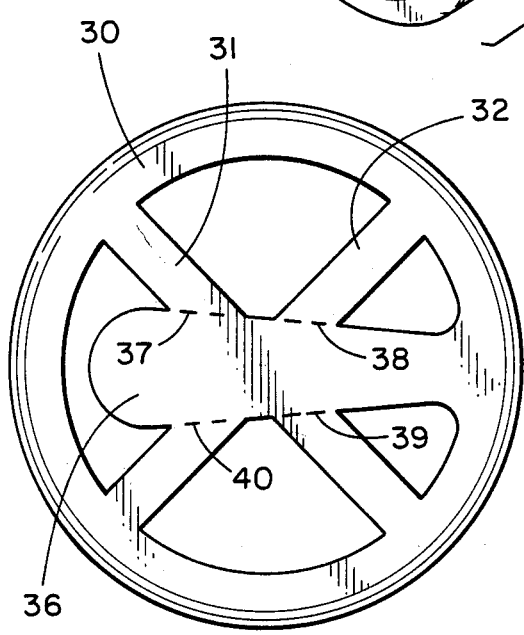
FIG. 4 is a front view of the wheel protector according to the present invention.

Referring to the drawings and particularly to FIGS. 1 to 7, a wheel protector 10 is illustrated according to the present invention, shown attached to the wheels of a dual wheel caster 11, designed primarily to protect the wheels of the caster from dirt, scuffing and other damage while the caster is attached to a piece of office equipment 13 during shipment.

Caster 11 itself is conventional and forms no part of the present invention, and as seen in the drawings includes a plastic central horn member 15 having a pintle 16 mounted in a vertical bore therein adapted to fit into a cooperating female adapter fixed to the bottom of the office equipment 13. The horn 15 has an axle (not shown) with ends that extend from both sides thereof into central bores in the caster wheels 17 and 18 to rotatably support the wheels on the axle and horn.

Each of the wheels 17 and 18 is a one-piece plastic molding that includes a cylindrical tread portion 20 and a slightly convex face or web portion 21, and these wheels are frequently constructed of an impact-resistant plastic such as Delrin.

Figure 5:
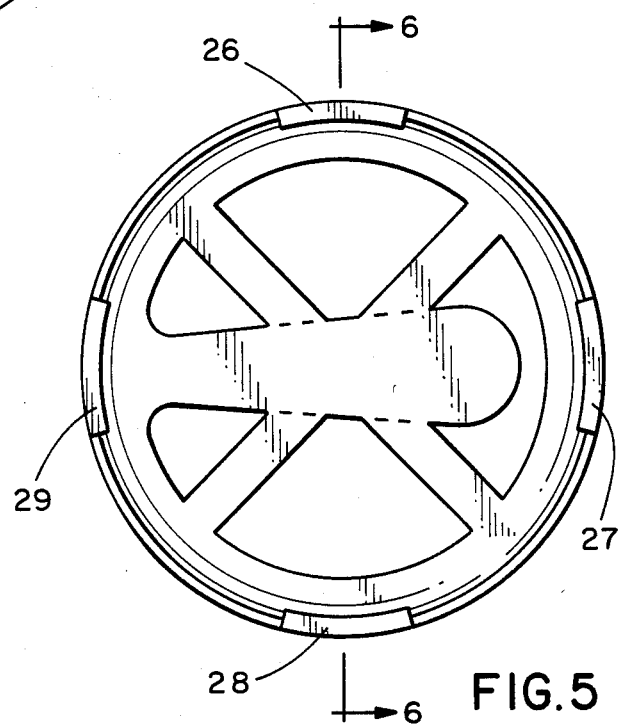
FIG. 5 is a rear view of a wheel protector according to the present invention.
Figure 6:
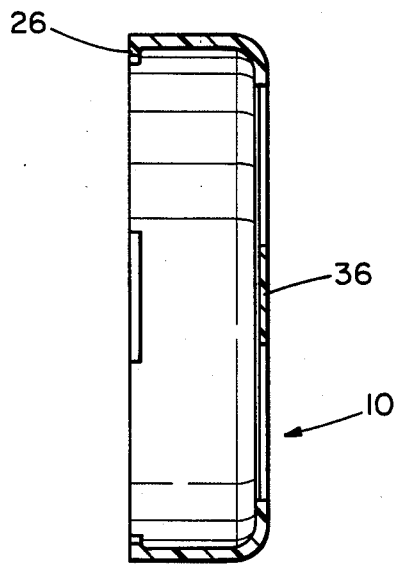
FIG. 6 is a longitudinal section of the wheel protector taken generally along line 6—6 of FIG. 5.
Figure 7:
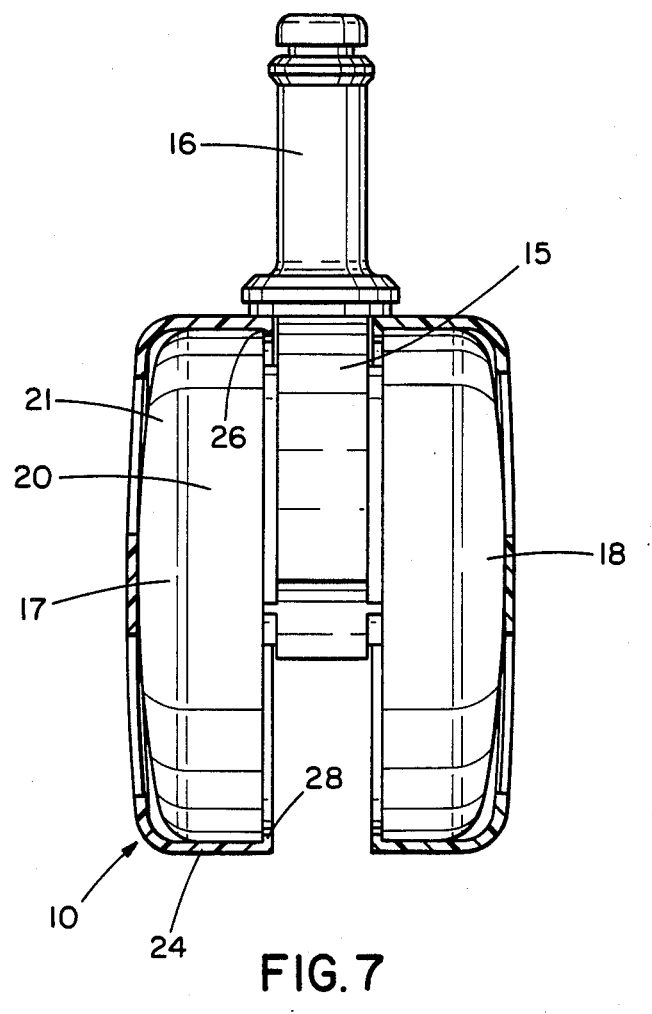
FIG. 7 is a front view of a dual wheel caster with the present wheel protectors installed over its wheel, shown in longitudinal section.

The wheel protectors 10 are each a one-piece plastic molding constructed of a durable plastic such as polypropylene and include a cylindrical tread-protecting portion 24 that fits over the wheel tread portion 20 with four radially inwardly projecting locking projections 26, 27, 28 and 29, seen clearly in FIGS. 5, 6 and 7. The locking projections 26, 27, 28 and 29 prevent the removal of the protector 10 during shipment even under rough treatment and heavy axial stressing.

An outer annular face portion 30 is formed integrally with the tread protecting portion 24 and serves to protect the edge of the tread from damage and also supports crossed web strips 31 and 32 that assist in protecting face 21 of the wheel.

The integral web strips 31 and 32 are orthogonally related and both intersect a diametral tapered pull tab 36 along perforations 37, 38, 39 and 40 that permit the pull tab to break away from the strips when the pull tab is firmly but manually pulled outwardly from the plane of the strips 31 and 32. The pull tab 36 extends almost entirely across the protector 10 to assist the web strips 31 and 32 in protecting the wheel face.

As seen in FIG. 7 the strips 31 and 32 and the pull tab 36 are coplanar and axially located with respect to the locking projections 26, 27, 28 and 29 to stress slightly when the protector is locked on the wheel and thereby act as a spring pulling the tread portion axially outwardly to securely hold the locking projections 26, 27, 28 and 29 against the inside of the wheel and prevent the inadvertent removal of the protector from the wheel even during rough handling.

The annular face portion 30 and the tread portion 24 are sufficiently thin so that they will break away upon a sharp manual pull of the pull tab 36. A wall thickness of 0.032 inches has been found satisfactory to achieve this result.

Figure 8:
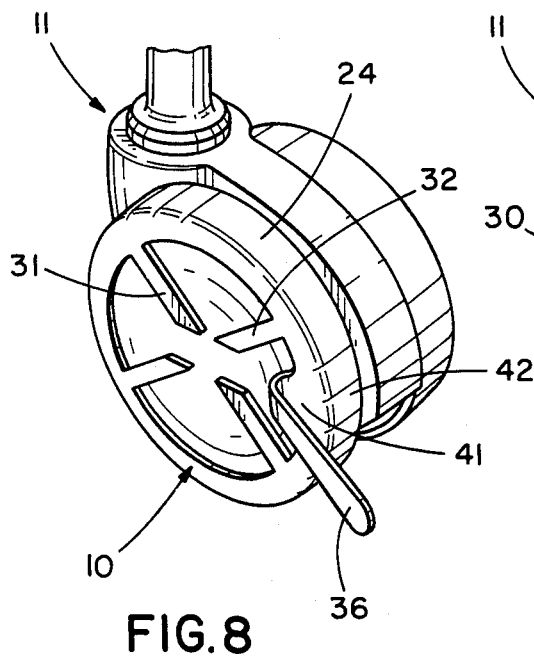
FIG. 8 is a perspective view of a dual wheel caster showing the breakaway pull tab separating from the crossed webs.
Figure 9:
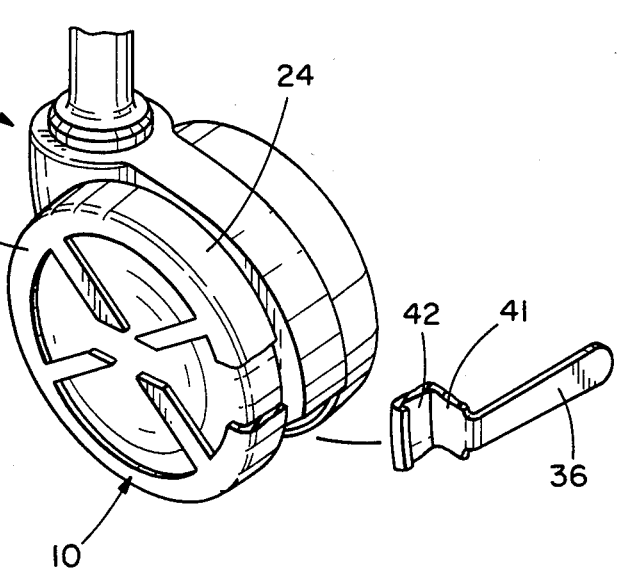
FIG. 9 is a perspective view of a dual wheel caster similar to FIG. 8 with the pull tab and part of the wheel tread protecting portion torn away from the remaining part of the protector during protector removal.

As seen in FIGS. 8 and 9 when the pull tab is initially pulled during the removal process, it breaks away from the crossed webs 31 and 32 along the perforation lines 37, 38, 39 and 40. This releases the tension somewhat on the locking projections 26, 27, 28 and 29. The breaking of the pull tab 36 from the webs 31 and 32 also causes the pull tab 36 to accelerate, facilitating the final breakaway of face portion area 41 and tread portion area 42 from the remainder of the protector 10, enabling the protector to be easily removed because it no longer has any peripheral integrity. Pull tab 36 may also break away along a single, rather than double, tear line through face portion area 41 and tread portion area 42.

I claim:

1. A wheel protector for a dual wheel caster of the type having a central horn member with an axle that rotatably supports two wheels each having an annular peripheral tread with an inner edge and outer face but without any annular groove, comprising:
   a one-piece flexible plastic molding including an unslotted smooth annular outer tread portion specifically designed for sliding over, attaching to and covering the wheel tred thereby protecting the wheel tread from contact with the ground without radially clamping the outer tread portion against the wheel, said outer tread portion having an inside surface and an outside surface;
   a face portion specifically designed to cover and protect the face of the wheel;
   a hand tab portion connected to the face portion;
   said face portion and outer tread portion being positioned radially outwardly of the hand tab portion and being sufficiently weak so that when the hand tab portion is manually pulled, the face portion and the outer tread portion positioned radially outwardly of the tab portion will break, permitting the protector to be easily removed from the wheel; and
   flexible elastically deformable substantially flat radial projection means permanently extending inwardly from the axially inner side of the outer tread portion substantially parallel to the face portion to engage the inner edge of the wheel tread, said radial projection means extending radially inwardly from the inner surface of the outer tread portion a sufficient distance to lock the protector on the wheel until the outer tread portion is broken during protector removal and said projection means providing only axial locking of the protector on the wheel and sized to exert no radial clamping on the wheel.

2. A wheel protector for a dual wheel caster as defined in claim 1, wherein said radial projection means includes a plurality of projections on the inner side of the outer tread portion that are permanently extending inwardly and positioned to snap over against the inner edge of the wheel tread without the urging of a tool.

3. A wheel protector for a dual wheel caster as defined in claim 2, wherein one of the axial locking projections is radially aligned with the tab portion so that it is broken with the face portion and outer portion radially outwardly of the tab portion.

4. A wheel protector for a dual wheel caster as defined in claim 1 wherein the face portion includes an annular wall specifically designed to cover a substantial amount of the face of the wheel and connected to the outer tread portion extending radially across a substantial portion of the wheel face to assist in protecting the wheel face.

5. A wheel protector for a dual wheel caster of the type having a central horn member with an axle that rotatably supports two wheels each having an annular peripheral tread with an inner edge and an outer face but without any annular groove, comprising:
   a one-piece flexible plastic molding including an unslotted smooth annular outer tread portion specifically designed for sliding over, attaching to and covering the wheel tread thereby protecting the wheel tread from contact with the ground without radially clamping the outer tread portion against the wheel;
   a face portion specifically designed to cover and protect the face of the wheel, said face portion including at least one radial web extending across the face of the wheel connected to the outer tread portion at one end thereof;
   a hand tab portion connected to the face portion, said hand tab portion intersecting the at least one web so that the hand tab portion extends across a major part of the face of the wheel, said face portion and outer tread portion being positioned radially outwardly of the tab portion and being sufficiently weak so that when the tab portion is manually pulled the face portion and the outer tread portion radially outwardly of the tab portion will break, permitting the protector to be easily removed from the wheel;
   flexible elastically deformable substantially flat radial projection means permanently extending inwardly from the axially inner side of the outer tread portion substantially parallel to the face portion to engage the inner edge of the wheel tread, said radial projection means permanently extending radially inwardly from the inner surface of the outer tread portion a sufficient distance to lock the protector on the wheel until the outer tread portion is broken during protector removal, said radial projection means providing only axial locking of the protector on the wheel and sized to exert no radial clamping in the wheel.

6. A wheel protector for a dual wheel caster of the type having a central horn member with an axle that rotatably supports two wheels each having an annular peripheral tread with an inner edge and an outer face, comprising: a one-piece plastic molding including; an annular outer portion adapted to slide over and be attached to and cover the wheel tread, a face portion adapted to cover and protect the face of the wheel, and a hand tab portion connected to the face portion, said face portion and outer portion radially outwardly of the tab portion being sufficiently weak so that when the tab portion is manually pulled with one hand the face portion and outer portion radially outwardly of the tab portion will break, permitting the protector to be easily removed from the wheel, the face portion including at least one radial web extending across the wheel face connected to the outer portion at one end thereof, said tab portion intersecting the web so that the tab portion extends across a major portion of the wheel face, there being provided two intersecting webs and the tab portion intersects both webs centrally of the protector.

7. A wheel protector for a dual wheel caster of the type having a central horn member with an axle that rotatably supports two wheels each having an annular peripheral tread with an inner edge and an outer face, comprising: a one-piece plastic molding including; an annular outer portion adapted to slide over and be attached to and cover the wheel tread, a plurality of radial projections on the inner side of the outer portion that snaps over the wheel tread inner edge to axially lock the protector on the wheel, an annular face portion extending radially inwardly from the outer side of the outer portion over a portion of the wheel face, a pair of intersecting webs extending radially from the annular face portion, and an elongated tab portion extending from the face portion radially across the protector intersecting the webs, said webs being sufficiently weak adjacent the tab portion so that the webs will break away from the tab portion as it is manually pulled whereby the protector may be easily removed from the wheel.

8. A wheel protector for a dual wheel caster of the type having a central horn member with an axle that rotatably supports two wheels each having an annular peripheral tread with an inner edge and an outer face but without any annular groove, comprising:

a one-piece flexible plastic molding including an unslotted smooth annular outer tread portion specifically designed for sliding over, attaching to and covering the wheel tread thereby protecting the wheel tread form contact with the ground without radially clamping the outer tread portion against the wheel;

a plurality of radial flexible elastically deformable projections on the inner side of the outer tread portion that snap over the wheel tread inner edge to axially lock the protector on the wheel;

an annular face portion extending radially inwardly from the outer side of the outer tread portion over a part of the wheel face;

a web extending radially across the annular face portion, and an elongated tab portion extending from the face portion radially across the protector intersecting the web, said web being sufficiently weak adjacent the tab portion so that the web will break away from the tab portion as it is manually pulled whereby the protector may be easily removed from the wheel;

said plurality of flexible elastically deformable substantially flat radial projection means permanently extending inwardly from the axially inner side of the outer tread portion substantially parallel to the face portion to engage the inner edge of the wheel, said plurality of radial projection means permanently extending radially inwardly from the inner surface of the outer tread portion a sufficient distance to lock the protector on the wheel until the outer tread portion is broken during protector removal and said radial projection means providing only axial locking of the protector on the caster wheel and sized to exert no radial clamping on the wheel.

9. A wheel protector for a dual wheel caster of the type having a central horn member with an axle that rotatably supports two wheels each having an annular peripheral tread with an inner edge and an outer face, comprising: a one-piece plastic molding including; an annular outer portion adapted to slide over and be attached to and cover the wheel tread, a plurality of radial projections on the inner side of the outer portion that snaps over the wheel tread inner edge to axially lock the protector on the wheel, an annular face portion extending radially inwardly from the outer side of the outer portion over a portion of the wheel face, a pair of intersecting webs extending radially across the annular face portion, and an elongated tab portion extending from the face portion radially across the protector intersecting the webs, said webs being sufficiently weak adjacent the tab portion so that the webs will break away from the tab portion as it is manually pulled whereby the protector may be easily removed from the wheel, said face portion and outer portion radially outwardly of the tab portion being sufficiently weak so they fracture as the tab portion is manually pulled.

* * * * *